Patented Jan. 19, 1954

2,666,704

UNITED STATES PATENT OFFICE 2,666,704

BAKING COMPOSITIONS

Elmer F. Glabe, Chicago, Ill., assignor to Food Technology, Inc., Chicago, Ill., a corporation of Illinois No Drawing. Application September 8, 1949, Serial No. 114,685

8 Claims. (Cl. 99—91)

This invention relates in general to the preparation of bakery products. More particularly the invention relates to bakery products having improved keeping qualities and fine texture. These results are accomplished by the addition of a novel emulsifying composition which causes the ordinarily incompatible ingredients to combine as a homogeneous mass.

This application is a continuation in part of my copending application U. S. Serial No. 45,561, filed August 21, 1948, now abandoned.

Considering the nature of the ingredients employed in baking mixtures, it will be understood that the mixing of these ingredients presents a difficult problem. Fats and liquids must be so combined that they will form a stable mixture which will not separate upon further processing. Further, the starch and protein present in bakery ingredients tend to be incompatible with one another and with the fats, oils and water present.

It is an object of this invention to provide bakery products of improved quality in which fatty bodies, liquids and other ingredients are present as a homogeneous mixture.

Another object of this invention is to provide bakery products having a soft crumb texture and a crisp and tender crust.

A further object of this invention is to provide bakery products which will have outstanding keeping qualities.

Another object of this invention is to provide a composition for incorporation into bakery products which will assist in the mixing of the ingredients into a homogenous mass.

A still further object is to provide an improved emulsifying agent by activating a dihydroxyphospholipid compound by the addition of small amounts of fat and water.

Other objects and advantages of this invention will become apparent from a consideration of the following description and examples.

In accordance with the present invention unusual results in the preparation of bakery products are achieved by employing an activated dihydroxyphospholipid. The dihydroxyphospholipid when activated exhibits exceptional emulsifying action on the fatty bodies and the liquids present in a bakery mix. Activation of the dihydroxyphospholipid has been found to be necessary in order that its effectiveness may be realized. It has been observed that the dihydroxyphospholipid exhibits no substantial effect for the purpose of the invention in its normal state, whereas upon activation by the method hereinafter described it becomes especially effective. The emulsifying action obtained through the use of activated dihydroxyphospholipid has heretofore been unobtainable by the use of an edible emulsifying compound.

An emulsifying agent is considered to have two functional portions, viz., the fat emulsifying portion and the water emulsifying portion. Activation of both of these functional portions of a dihydroxyphospholipid compound is desirable for the purpose of the invention though activation of either portion will have some desirable effect.

It is preferable to activate first the fat emulsifying portion of the dihydroxyphospholipid compound as by premixing the dihydroxyphospholipid with a shortening compound prior to incorporation into a baking mix. Activation of the fat emulsifying portion is then followed by activation of the water emulsifying portion by thoroughly mixing with a small quantity of water. The water may be added as such or it may be supplied by the other ingredients of the baking mix, e. g., by intimate mixing with a starch or flour containing activating amounts of moisture. The activating process may be reversed, if desired, by first mixing the dihydroxyphospholipid with an activating quantity of water or water-containing ingredient followed by mixing with a quantity of fat.

A certain amount of moisture is required to activate the water emulsifying portion of the dihydroxyphospholipid compound. The optimum amount is about 1 part by weight of water to 2.5 parts by weight of dihydroxyphospholipid employed, but it has been observed that 1 part by weight of water to 10 parts by weight of the dihydroxyphospholipid will activate it to a limited degree. About 6 parts by weight of water to 7 parts by weight of dihydroxyphospholipid has been employed and represents the approximate maximum in making a dry baking compound for use in bread manufacture. An excess of water is not harmful to the dihydroxyphospholipid and need be avoided only to the extent that it produces unsatisfactory properties in the bakery mix.

In like manner a certain amount of fat is required for the activation of the fat emulsifying portion of the dihydroxyphospholipid compound. Activation has been observed when 1 part by weight of fat is present per 12 parts by weight of dihydroxyphospholipid. The optimum activation of the emulsifying compound takes place when approximately 5 parts by weight of fat is present to 3 parts by weight of dihydroxyphospholipid.

Eight parts by weight of fat to 1 part by weight of dihydroxyphospholipid have been employed for the purpose of the invention.

As hereinbefore stated, the moisture content may be added directly as water or it may be introduced in a carrier, such as a flour or starch which may contain from about 6% to 14% by weight of water. While only a portion of this water is available water, the remainder being more tightly bound up by the flour, the unbound portion or the water is effective to activate the dihydroxyphospholipid compound. If the aforementioned unbound water is insufficient in quantity to supply the critical amount of moisture necessary to activate the water emulsifying end of the dihydroxyphospholipid compound, then an additional amount of water must be added to supply the deficit.

In a preferred embodiment of the invention the dihydroxyphospholipid was activated by preparing a baking compound containing 10 pounds of fat, 6 pounds of a dihydroxyphospholipid and 2½ pounds of water. It is best to premix the fat and the dihydroxyphospholipid and then add the water. The emulsion thus prepared may be incorporated into a bread dough where it will be very effective in emulsifying the ingredients into a homogeneous mass.

In another embodiment I may use 10 pounds of fat, 6 pounds of dihydroxyphospholipid and 84 pounds of an amylaceous material. The moisture content of the amylaceous material will usually range from about 6% up to about 14%, and will usually contain enough unbound moisture to supply an activating quantity thereof to the dihydroxyphospholipid. If the amount of moisture in the amylaceous material available as free moisture is less than about 3% it is desirable to add enough water to bring the free moisture content up to at least 3%. The resulting compound is well suited for addition to bakery mixes, particularly bread doughs, and will result in the emulsification of the bakery ingredients into the desirable homogeneous mass.

For the purpose of illustrating the invention I may carry out a process of making bread by the sponge and dough method in which a formula is prepared consisting of the following ingredients:

360 grams spring wheat patent flour
12 grams yeast
1.25 grams yeast food
216 cc. water Mix 3 minutes and ferment at 80 degrees F. for 3½ hours. Then add 240 grams winter wheat patent flour
18 grams sugar
18 grams powdered skim milk
24 grams lard
12 grams salt
170 cc. water Mix 3 minutes and ferment 20 minutes at 80 degrees F. Divide the formula into 2 portions of 450 grams each and mold, and place in pans. Retain the molded pieces at 95 degrees F. for 50 minutes at a relative humidity of about 90%. Then bake the dough at 450 degrees F. for 28 minutes. The bread produced by the above method suffers the usual limitations of improper mixing and poor keeping qualities. The nature of the ingredients is such that the mechanical mixing means employed fail to give a truly homogeneous mass under the conditions usually encountered. Bread made in the above manner has a texture which has a tendency to become hard and tough during storage thereby diminishing its saleability.

The addition of about 3.0 grams of an activated dihydroxyphospholipid emulsifying compound to the bread formula recited above produces a bread having improved crumb texture. Sixteen hours after coming from the oven the crumb was measurably softer and more moist than in the case of standard bread. Similar loaves, wrapped in wax paper and stored at 80 degrees F. for 5 days showed a remarkable softness of crumb texture whereas the standard bread under like conditions had a much harder texture.

In another embodiment of the invention I have found that addition of an activated dihydroxyphospholipid emulsifying compound makes possible a reduction in the amount of shortening necessary in bread making. For example, instead of the 24 grams of shortening employed in the aforementioned standard bread formula, I may use 12 grams of shortening and 3.0 grams of an activated dihydroxyphospholipid. The bread thus prepared has the same soft crumb texture and the same outstanding keeping qualities as the modified bread described above. While the exact reason for this is not definitely known, it appears that the addition of an activated dihydroxyphospholipid promotes much better mixing of the fats, oils, water, starch, protein, and other ingredients and thereby obviates the need for excess shortening.

It will be noted that only a very small amount of an activated dihydroxyphospholipid compound is required to give a much improved baked product. In the previous examples the dihydroxyphospholipid was added in the amount of about 0.50% by weight based on the weight of the flour in the dough. Appreciable effects have been obtained from as low as 0.10% by weight of the emulsifier while in some bakery goods an activated dihydroxyphospholipid may be used with desirable results up to 2.50% by weight of the flour. The amount of activated dihydroxyphospholipid is referred to as a percentage by weight of the total flour used because the make-up of the mixture is not critical, i. e., the ingredients employed in preparing the mixture for baking may be varied widely to suit the individual tastes and purposes without departing from the spirit of this invention, so long as the prescribed amount of activated dihydroxyphospholipid is incorporated therein.

While the foregoing examples have been directed to the use of an activated dihydroxyphospholipid in a fermented dough type of bread, it is to be understood that similar results may be obtained in other kinds of breads. For instance, salt rising breads, baking powder breads, and breads made by the dough brake method are contemplated by the invention.

When the proper amount of activated dihydroxyphospholipid emulsifier is used, the ingredients become much more thoroughly mixed into a colloidal mass which bakes into a product having a much softer crumb structure than that of standard baked goods. The crust character of the goods is also measurably better, being more crisp and tender than the standard product. The outstanding characteristic of the emulsified product is the improved keeping quality of the finished baked goods. Bread containing an activated dihydroxyphospholipid retained its softness of crumb structure over a period of five days while standard bread became definitely harder in less than that time. Similar qualities have been observed in cakes and cookies to which the activated emulsifier had been added.

The advantages of employing my new emulsifying compound in cakes may be illustrated by making up a standard pound cake according to the following formula:

*Pound cake formula*

350 grams flour
350 grams sugar
210 grams shortening
20 grams milk powder
10 grams salt
130 grams water
218 grams eggs Sift flour twice. Place all ingredients in larger mixing bowl. Mix on low speed one minute. Scrape well. Mix on second speed five minutes. Scrape. Mix on second speed five minutes longer, scrape. Finish mixing on second speed two minutes. Do not scrape. Scale 2½ pounds into paper lined pans, very lightly greased or lined with brown paper. Bake at 325 degrees F. for 1½ hours.

To the above formula may be added from 0.01% to 5.0% by weight of an activated dihydroxyphospholipid compound based on the total weight of the cake mix. Especially good results are obtained by adding about 0.05% of an activated dihydroxyphospholipid. One good method is to make up a combination containing 1% of activated dihydroxyphospholipid and 99% starch (for example, potato starch containing 15% by weight $H_2O$) and to add the combination in calculated amounts to the flour or shortening before mixing. I have found further that the addition of a small amount of water (e. g., 3% by weight of the total mix) along with the emulsifier may be desirable.

Cakes to which the activated dihydroxyphospholipid has been added are remarkably softer in texture than the standard pound cake. Additionally, the modified cake has very good keeping properties since it will retain a moist, soft crumb structure for a considerable time and will not become stale as quickly as standard pound cake.

In the baking of cookies similar excellent results may be obtained by employing my novel method of adding activated dihydroxyphospholipid emulsifier to the cookie batter. A standard cookie was made in which the following formula was employed:

Mix 80 grams fine granulated sugar with 80 grams vegetable shortening for one minute at slow mixing speed and scrape. Add 1.25 grams salt and .31 gram soda and mix for one minute at medium speed—scrape. Add slowly 10 grams whole egg and 1.25 grams vanilla while mixing at medium speed—scrape. Then add 55 cc. of water, 0.08 gram of ammonia and 10 grams corn syrup while mixing at medium speed—scrape. Incorporate 125 grams cookie flour and mix for 30 seconds at slow speed—scrape. Bake at 375 degrees F. until lightly browned.

To the standard cookie formula may be added from 0.1% to 2.0% by weight of an activated dihydroxyphospholipid compound based on the total weight of the cookie batter, depending on the results desired. A particularly advantageous way to add the emulsifier is by making up a mixture of about 2.5% by weight of an activated dihydroxyphospholipid and 97.5% by weight of starch (e. g., potato starch) and substituting said mixture for about 20% of the shortening on a weight for weight basis.

In a test by a panel of blindfolded testers, cookies produced in the above manner with added activated dihydroxyphospholipid were unanimously chosen for their smoother texture over similar cookies made without dihydroxyphospholipid. Under normal adverse storage conditions the cookies with added activated dihydroxyphospholipid exhibited far superior keeping qualities over unmodified cookies.

Another convenient method for expressing the proportion of activated dihydroxyphospholipid to be admixed with bakery products is in terms of percentage by weight of the dry ingredients in the product. In this manner the amount of liquids added to the mixture may be varied without influencing the ratio of dihydroxyphospholipid to dry ingredients. As an example, a baked loaf of bread made according to the dihydroxyphospholipid modified bread formula described herein would contain from 0.087% to 2.18% by weight of activated dihydroxyphospholipid. A cake made according to the dihydroxyphospholipid modified cake formula would contain from 0.011% to 5.5% by weight of an activated dihydroxyphospholipid. Cookies baked by the dihydroxyphospholipid modified method will contain from 0.012% to 2.35% by weight of activated dihydroxyphospholipid.

The dihydroxyphospholipids disclosed herein may be obtained by treating the phosphatids under conditions which bring about hydroxylation of the phosphatide. Phosphatides have the general formula

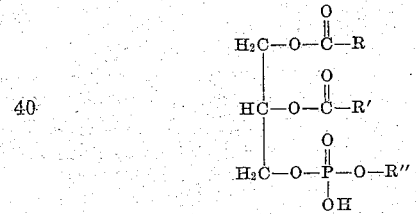

where R and R' are the hydrocarbon radicals of the higher fatty acids, some of which are unsaturated and R" is either a choline radical, a cholamine radical or a serine radical. The phosphate radical may occupy either the alpha or beta position. In the lecithins, R" is the choline radical, and in the cephalines R" is the cholamine radical.

It has been found that hydroxylation of such molecules at a double bond of the unsaturated fatty acids can be accomplished by treating the phosphatides with hydrogen peroxide, preferably in the presence of a water soluble aliphatic carboxylic acid, e. g., acetic, lactic, citric, tartaric, and the like, or with the peracids of such water soluble aliphatic carboxylic acids, e. g., peracetic, perlactic, and the like. As indicated, it is preferred to treat either with a mixture of hydrogen peroxide and edible acids or with the peracid of an edible acid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. It has not been possible, however, to directly measure the hydroxyl groups, since the conditions for such measurement result in decomposition of the phosphatide. However, the product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

In a specific example 100 grams of crude soy bean lecithin, having an iodine value of 95.7, were warmed to approximatrely 50 degrees C., at which temperature it melts. Three (3) grams of 75% lactic acid were added and mixed in and 14 grams of 100 volume $H_2O_2$ were added slowly with agitation while maintaining the temperature at 50 degrees C. This mixture was stirred for one hour at 50 degrees C. and then dried under a vacuum of 27.5 inches until the moisture content was less than 1%. The iodine value of the resulting material was 84.0. This material is easily emulsified in water and is a very effective emulsifying agent.

The dihydroxyphospholipids emulsifying composition has also been prepared by mixing together 2500 grams of lecithin and 35.5 grams of 75% lactic acid. Then 175 grams of 100 volume hydrogen peroxide was added slowly over a period of 30 minutes. The emulsifier was stirred for one hour and dried under vacuum. At this point 47 grams of a 10% sodium hydroxide solution was added slowly and the temperature controlled so that it did not go above 70 degrees C. The drying was then continued until the moisture content was less than 1%. The resultant material had an iodine value of 84 and showed greatly improved properties as an emulsifying agent.

In still another method for making the dihydroxyphospholipid emulsifying composition 495 pounds of crude soybean lecithin was warmed to 55 degrees C. with mixing. Then 15 pounds of 75% lactic acid was added and 70 pounds of 100 volume hydrogen peroxide was added slowly over a period of 30 minutes. The mixture was stirred for one hour and then dried under vacuum. Then 6.5 pounds of flake caustic in a 10% water solution was added and stirred in well. This mixture was then dried under vacuum. In all 528 pounds of finished material was obtained having an iodine value of 85.3 and exhibiting superior emulsifying properties.

The phosphatide materials are preferably hydroxylated from 5% to 25%, depending upon the concentration of materials used, the time and the temperature. It is important that the temperature be maintained below 75 degrees C. in order to prevent decomposition of the raw materials. The dihydroxyphospholipids exhibiting the best results are obtained by hydroxylating to about 10% as measured by reduction in the iodine value.

The term "baking mix" is used herein to describe the mixture of ingredients which are employed in the manufacture of bakery products. In breads the baking mix ordinarily consists of flour, yeast, yeast food, water, sugar, milk powder, shortening, salt, and in some cases, flavorings. In cakes the baking mix usually comprises flour, sugar, shortening, milk powder, salt, water, eggs, flavorings and colorings. In cookies the baking mix is similar consisting of sugar, shortening, eggs, flavoring, water, flour, salt, syrup and the like. Other combinations of the same or similar ingredients are employed in all bakery goods.

It will be seen from the foregoing disclosure that new and unusual results have been achieved in the preparation of bakery goods by the addition of an activated dihydroxyphospholipid emulsifying agent. The invention contemplates addition of the emulsifier to any and all kinds of bakery goods such as breads, cookies, cakes, doughnuts, raised rolls, etc. The bakery goods which are produced by the practice of this invention have a softer crumb texture than ordinary unmodified bakery goods and this soft texture is retained over a greater period of time. Additional advantages of the practice of this invention include lower cost resulting from a reduction in the amount of shortening which need be employed to give high-quality bakery goods. A still further advantage is the improved keeping qualities of the baked goods.

The invention is hereby claimed as follows:

1. The method of preparing bakery products which comprises incorporating into a baking mix between 0.01% and 5.0% by weight of the total baking mix of an activated dihydroxyphospholipid and baking said mix, said dihydroxyphospholipid having been activated by intimately premixing between 1 part by weight of fat to 12 parts by weight of dihydroxyphospholipid and 8 parts by weight of fat to 1 part by weight of dihydroxyphospholipid and between 1 part by weight of water to 10 parts by weight of dihydroxyphospholipid and 6 parts by weight of water to 7 parts by weight of dihydroxyphospholipid said dihydroxyphospholipid being a hydroxylated phosphatide which is hydroxylated at the double bonds of the unsaturated fatty acid portion of the phosphatide.

2. A baking composition comprising a baking mix and between 0.01% and 5.0% by weight of the baking mix of an activated dihydroxyphospholipid, said dihydroxyphospholipid having been activated by intimately premixing between 1 part by weight of fat to 12 parts by weight of dihydroxyphospholipid and 8 parts by weight of fat to 1 part by weight of dihydroxyphospholipid and between 1 part by weight of water to 10 parts by weight of dihydroxyphospholipid and 6 parts by weight of water to 7 parts by weight of dihydroxyphospholipid, said dihydroxyphospholipid being a hydroxylated phosphatide which is hydroxylated at the double bonds of the unsaturated fatty acid portion of the phosphatide.

3. The method of making bread which comprises incorporating into bread dough between 0.10% and 2.5% by weight of an activated dihydroxyphospholipid based on the weight of flour present, said dihydroxyphospholipid having been activated by intimately premixing between 1 part by weight of fat to 12 parts by weight of dihydroxyphospholipid and 8 parts by weight of fat to 1 part by weight of dihydroxyphospholipid and between 1 part by weight of water to 10 parts by weight of dihydroxyphospholipid and 6 parts by weight of water to 7 parts by weight of dihydroxyphospholipid, said dihydroxyphospholipid being a hydroxylated phosphatide which is hydroxylated at the double bonds of the unsaturated fatty acid portion of the phosphatide.

4. A bread making composition comprising bread dough and between 0.10% and 2.5% by weight of an activated dihydroxyphospholipid based on the weight of flour present, said dihydroxyphospholipid having been activated by intimately premixing between 1 part by weight of fat to 12 parts by weight of dihydroxyphospholipid and 8 parts by weight of fat to 1 part by weight of dihydroxyphospholipid and between 1 part by weight of water to 10 parts by weight of dihydroxyphospholipid and 6 parts by weight of water to 7 parts by weight of dihydroxyphospholipid, said dihydroxyphospholipid being a hydroxylated phosphatide which is hydroxylated at the double bonds of the unsaturated fatty acid portion of the phosphatide.

5. The method of preparing bakery products which comprises incorporating into a baking mix between 0.01% and 5.0% by weight of the total baking mix of an activated dihydroxyphospholipid and baking said mix, said activated dihydroxyphospholipid being prepared by premixing a dihydroxyphospholipid first with about 5 parts by weight of a fatty material to 3 parts by weight of dihydroxyphospholipid and then with about 1 part by weight of water to 2.5 parts by weight of dihydroxyphospholipid present, said dihydoxyphospholipid being a hydroxylated phosphatide which is hydroxylated at the double bonds of the unsaturated fatty acid portion of the phosphatide.

6. A baking composition comprising a baking mix and between 0.01% and 5.0% by weight of the baking mix of an activated dihydroxyphospholipid, said activated dihydroxyphospholipid being prepared by premixing a dihydroxyphospholipid first with about 5 parts by weight of a fatty material per 3 parts by weight of dihydroxyphospholipid and then with about 1 part by weight of water per 2.5 parts by weight of dihydroxyphospholipid present, said dihydroxyphospholipid being a hydroxylated phosphatide which is hydroxylated at the double bonds of the unsaturated fatty acid portion of the phosphatide.

7. The method of making bread which comprises incorporating into a bread dough approximately 0.50% by weight of an activated dihydroxyphospholipid based on the weight of flour present and baking said mix, said activated dihydroxyphospholipid being prepared by premixing a dihydroxyphospholipid first with about 5 parts by weight of a fatty material to 3 parts by weight of dihydroxyphospholipid and then with about 1 part by weight of water to 2.5 parts by weight of dihydroxyphospholipid present, said dihydroxyphospholipid being a hydroxylated phosphatide which is hydroxylated at the double bonds of the unsaturated fatty acid portion of the phosphatide.

8. A bread making composition comprising bread dough and approximately 0.50% by weight of an activated dihydroxyphospholipid based on the weight of flour present, said activated dihydroxyphospholipid being prepared by premixing a dihydroxyphospholipid first with about 5 parts by weight of a fatty material to 3 parts by weight of dihydroxyphospholipid and then with about 1 part by weight of water to 2.5 parts by weight of dihydroxyphospholipid present, said dihydroxyphospholipid being a hydroxylated phosphatide which is hydroxylated at the double bonds of the unsaturated fatty acid portion of the phosphatide.

ELMER F. GLABE.

References Cited in the file of this patent

UNITED STATES PATENTS

| Number | Name | Date |
| --- | --- | --- |
| 1,831,728 | Working | Nov. 10, 1931 |
| 1,936,718 | Jordan | Dec. 31, 1931 |
| 2,062,782 | Epstein | Dec. 1, 1936 |
| 2,090,537 | Lund | Aug. 17, 1937 |
| 2,115,088 | Schweiger | Apr. 26, 1938 |
| 2,201,063 | Thurman | May 14, 1940 |
| 2,445,948 | Wittcoff | July 27, 1944 |

OTHER REFERENCES

Karrer: Organic Chemistry (2 Ed.), Elsevier Pub. Co., Inc., New York, 1946, page 206.